US010876700B2

(12) United States Patent
Scoville

(10) Patent No.: US 10,876,700 B2
(45) Date of Patent: Dec. 29, 2020

(54) ADAPTIVE BEAM SCANNING HEADLAMP

(71) Applicant: Flex-N-Gate Advanced Product Development, LLC, Tecumseh (CA)

(72) Inventor: Jonathan Scoville, Hudsonville, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 16/561,622

(22) Filed: Sep. 5, 2019

(65) Prior Publication Data

US 2020/0072433 A1 Mar. 5, 2020

Related U.S. Application Data

(60) Provisional application No. 62/727,086, filed on Sep. 5, 2018.

(51) Int. Cl.
| | | |
|---|---|---|
| *F21S 41/675* | (2018.01) | |
| *F21S 41/25* | (2018.01) | |
| *F21S 41/663* | (2018.01) | |
| *B60Q 1/14* | (2006.01) | |

(Continued)

(52) U.S. Cl.
CPC ............ *F21S 41/675* (2018.01); *B60Q 1/143* (2013.01); *F21S 41/151* (2018.01); *F21S 41/25* (2018.01); *F21S 41/663* (2018.01); *B60Q 2300/05* (2013.01); *F21W 2102/14* (2018.01)

(58) Field of Classification Search
CPC ............ B60Q 1/143; B60Q 2300/05; B60Q 2300/056; F21S 41/148; F21S 41/151; F21S 41/25; F21S 41/255; F21S 41/321; F21S 41/663; F21S 41/675; F21W 2102/14

See application file for complete search history.

(56) References Cited

U.S. PATENT DOCUMENTS

| | | | |
|---|---|---|---|
| 6,118,569 A * | 9/2000 | Plesko | G02B 7/1821 |
| | | | 359/201.1 |
| 9,134,000 B2 | 9/2015 | de Lamberterie et al. | |
| 9,227,555 B2 * | 1/2016 | Kalapodas | B60Q 1/085 |

(Continued)

FOREIGN PATENT DOCUMENTS

| | | |
|---|---|---|
| DE | 102016212069 A1 | 1/2018 |
| RU | 2289754 C1 | 12/2006 |

OTHER PUBLICATIONS

PCT Patent Application No. PCT/US2019/049695 International Search Report and Written Opinion dated Dec. 12, 2019.

*Primary Examiner* — Tsion Tumebo

(74) *Attorney, Agent, or Firm* — Erise IP, P.A.

(57) ABSTRACT

An adaptive beam scanning headlamp for a vehicle includes a plurality of light sources arranged linearly, with each of the plurality of light sources having a linear array of LEDs. A plurality of primary projection lenses shape light from the plurality of light sources. An oscillating mirror obliquely angled between the plurality of primary projection lenses and a secondary projection lens receives light from the plurality of primary projection lenses and redirects the light to the secondary projection lens. The secondary projection lens is adapted to further shape the light for projecting a beam pattern from the vehicle. A controller is adapted for controlling each of the plurality of light sources and the oscillating mirror to actively dim or turn off portions of the beam pattern for reducing glare perceived outside the vehicle.

20 Claims, 12 Drawing Sheets

US 10,876,700 B2

Page 2

(51) Int. Cl.
*F21S 41/151* (2018.01)
*F21W 102/14* (2018.01)

(56) References Cited

U.S. PATENT DOCUMENTS

| | | | |
|---|---|---|---|
| 10,267,474 B2* | 4/2019 | King | F21S 41/16 |
| 2002/0081070 A1 | 9/2002 | Tew | |
| 2008/0170284 A1* | 7/2008 | Hayashi | B41J 2/471 |
| | | | 359/216.1 |
| 2009/0096994 A1* | 4/2009 | Smits | G01B 11/14 |
| | | | 353/30 |
| 2011/0127404 A1* | 6/2011 | Yen | G02B 26/105 |
| | | | 250/201.1 |
| 2012/0154591 A1* | 6/2012 | Baur | B60R 1/00 |
| | | | 348/148 |
| 2017/0282786 A1* | 10/2017 | Toda | F21S 41/39 |
| 2018/0335192 A1* | 11/2018 | Tanaka | F21S 41/153 |

\* cited by examiner

ADAPTIVE BEAM SCANNING HEADLAMP

CROSS-REFERENCE TO RELATED APPLICATIONS

This application claims the benefit of U.S. Provisional Application No. 62/727,086 entitled "Adaptive Beam Scanning Headlamp" and filed on Sep. 5, 2018, which is herein incorporated by reference in its entirety.

BACKGROUND

1. Field of the Disclosure

Embodiments of this disclosure relate generally to the field of headlamp assemblies for use in vehicles. More specifically, embodiments of this disclosure relate to beam scanning generation for adaptive-driving beam headlamps.

2. Description of the Related Art

Many types of headlamps for vehicles are described in the prior art. An example having a scanning beam pattern is U.S. Pat. No. 4,363,085 to Demas which discloses a vehicle headlamp having reflectors that scan a collimated beam of light to generate a desired light beam pattern. U.S. Pat. No. 9,809,153 to Park et al. discloses a vehicle headlamp that includes a microelectromechanical system (MEMS) scanner configured to reflect laser light towards a condenser lens.

SUMMARY

In an embodiment, a headlamp for a vehicle includes a light source and a primary projection lens for shaping light from the light source. The primary projection lens is adapted to shape light along a first direction. An oscillating mirror is obliquely angled between the primary projection lens and a secondary projection lens to receive light from the primary projection lens and redirect the light to the secondary projection lens. The secondary projection lens is adapted to shape light received from the oscillating mirror along a second direction substantially perpendicular to the first direction such that a desired light pattern is projected from the vehicle.

In another embodiment, an adaptive beam scanning headlamp for a vehicle includes a plurality of light sources arranged linearly, with each of the plurality of light sources having a linear array of LEDs. A plurality of primary projection lenses shape light from the plurality of light sources. An oscillating mirror obliquely angled between the plurality of primary projection lenses and a secondary projection lens receives light from the plurality of primary projection lenses and redirects the light to the secondary projection lens. The secondary projection lens is adapted to further shape the light for projecting a beam pattern from the vehicle. A controller is adapted for controlling each of the plurality of light sources and the oscillating mirror to actively dim or turn off portions of the beam pattern for reducing glare perceived outside the vehicle.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure include an adaptive driving beam headlamp for a vehicle that provides a means to dim or turn off portions of the headlamp for the purpose of reducing glare as perceived by someone outside the vehicle (e.g., an occupant of another vehicle or a pedestrian).

Figure 1:
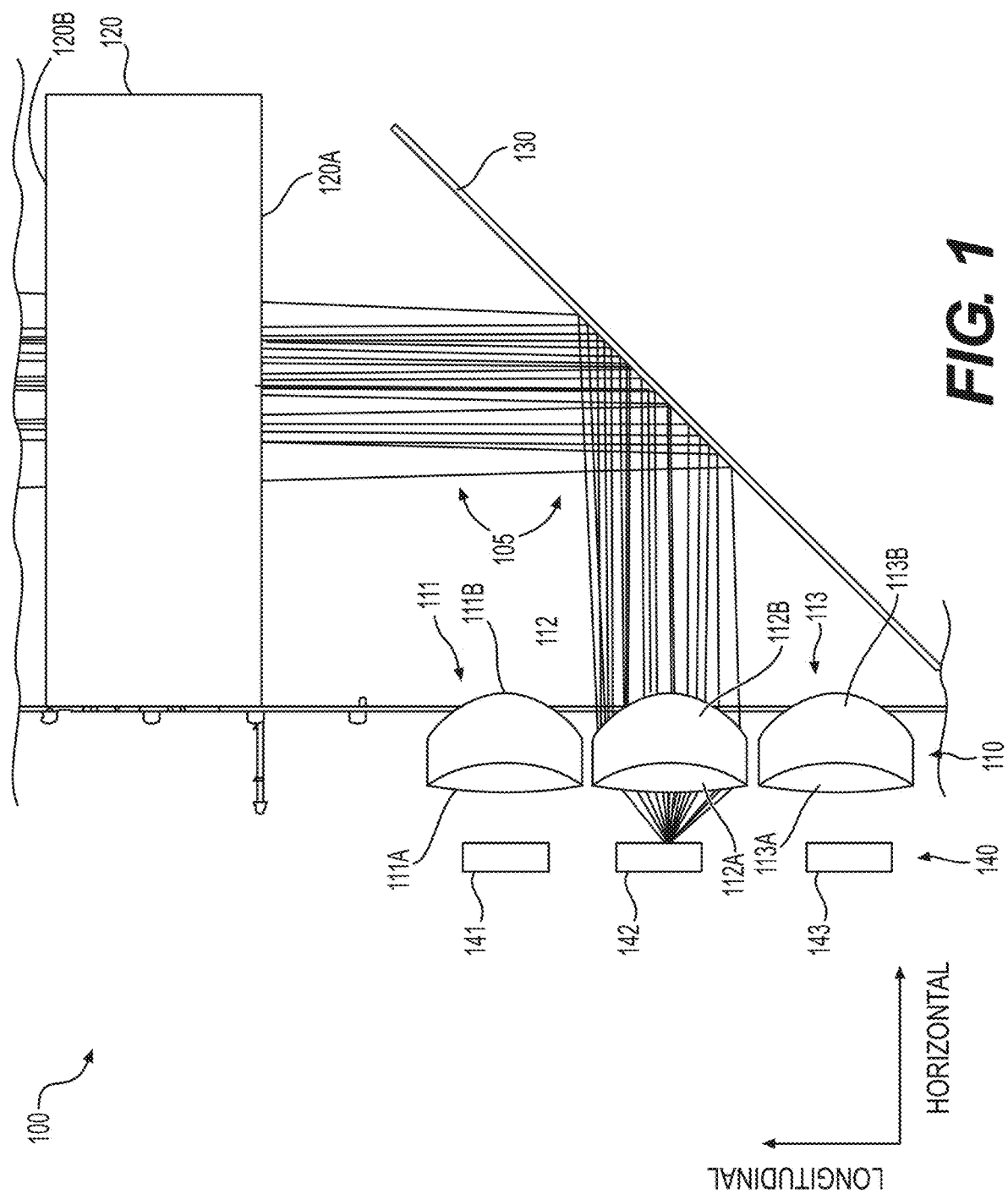
FIG. 1 shows a top-down view of an adaptive beam scanning headlamp, in an embodiment.

FIG. 1 depicts a top-down view of an adaptive beam scanning headlamp 100. Beam scanning headlamp 100 includes one or more primary projection lenses 110, a secondary projection lens 120, an oscillating beam scanning mirror 130, and one or more light sources 140. As depicted in FIG. 1, the oscillating beam scanning mirror 130 is arranged obliquely between the one or more primary projection lenses 110 and secondary projection lens 120 such that rays of light 105 passing through one or more primary projection lenses 110 reflect off of beam scanning mirror 130 and are redirected towards secondary projection lens 120.

In certain embodiments, more than one light source may be used to meet the intensity requirements of a high-beam headlamp. For this reason, a plurality of primary projection lenses may be used to boost the performance of the beam pattern.

In the embodiment depicted in FIG. 1, the one or more light sources 140 include a first light source 141, a second light source 142, and a third light source 143, with the first, second, and third light sources 141-143 being arranged substantially linearly parallel with one another (e.g., along a single line) in a longitudinal direction. The number and arrangement of the one or more light sources 140, and the number of corresponding primary projection lenses 110 may be varied based on the illumination requirements of the headlamp and the luminance provided by the individual light sources, among other things.

In certain embodiments, the one or more light sources 140 each include one or more light-emitting diodes (LEDs). For example, first light source 141 may include a single LED or a plurality of LEDs mounted on a die. Second and third light sources 142, 143 may include the same or a different number of LEDs as first light source 141. In certain embodiments, each of first, second, and third light sources 141, 142, 143 includes a 1×3 array of LEDs. The LEDs in each 1×3 array may be arranged substantially parallel with one another along the longitudinal direction (e.g., in the disclosed embodiment, oriented end-to-end in a line and are also oriented to emit light in the same direction from spaced-apart locations). The number of LEDs in each array and their arrangement may be varied based on the illumination requirements of the headlamp and the luminance provided by the individual LEDs, among other things. For example, a higher number of LEDs increases resolution for the adaptive light shaping capability of an adaptive-driving beam headlamp.

In the embodiment depicted in FIG. 1, the one or more primary projection lenses 110 includes a first primary projection lens 111, a second primary projection lens 112, and a third primary projection lens 113 aligned substantially linearly parallel with one another (e.g., along a single line). Each of the first, second, and third primary projection lenses 111, 112, 113 are centered over first, second, and third light sources 141, 142, 143, respectively, for shaping light emitted from the light sources, as further described below.

Figure 2:
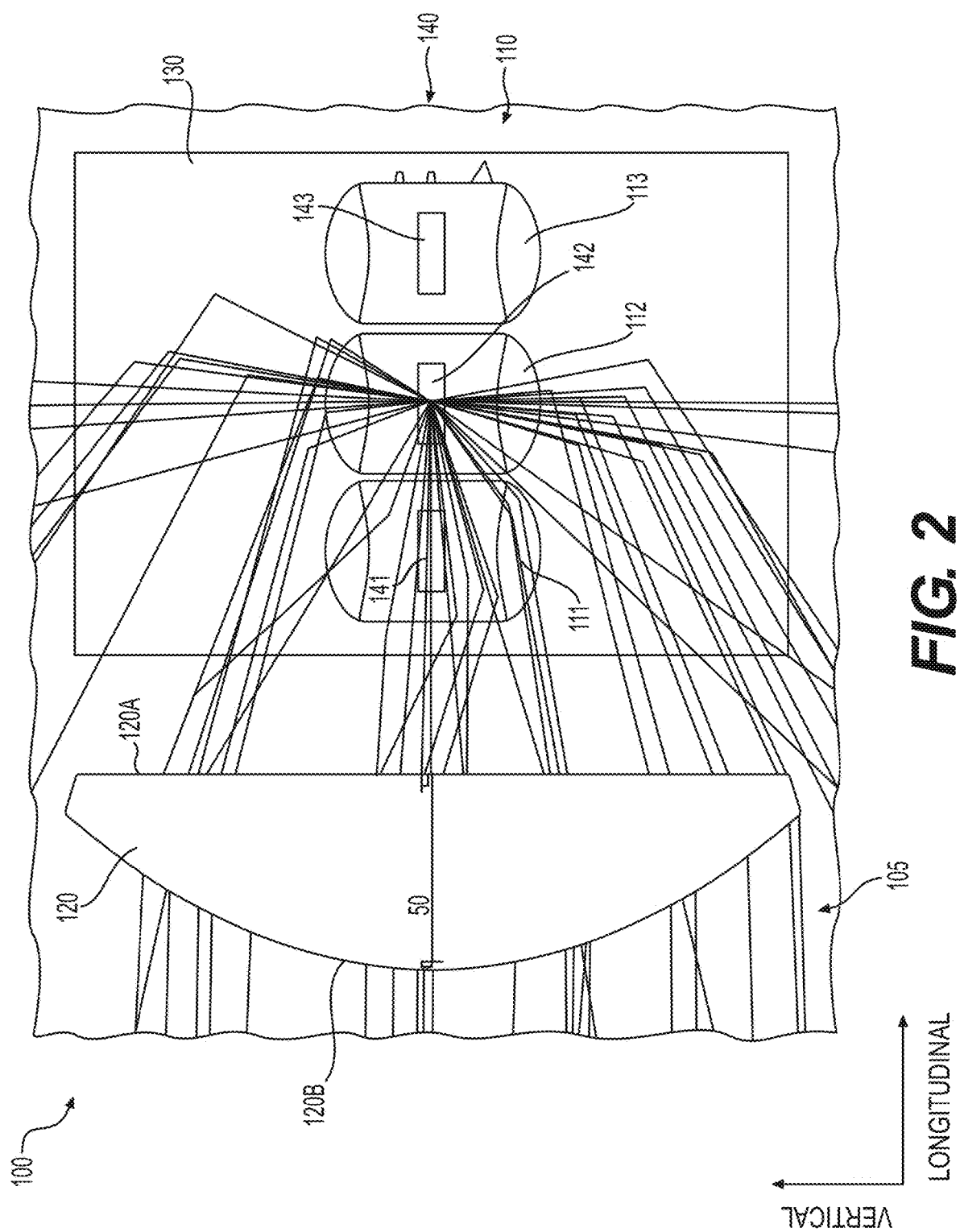
FIG. 2 shows a side view of the adaptive beam scanning headlamp of FIG. 1.

FIG. 2 depicts a side view of a beam scanning headlamp 100, FIG. 1. The side view of FIG. 2 provides a perspective as viewed from behind the one or more light sources 140, with second light source 142 turned on and first and third light sources 141, 143 turned off. FIGS. 1 and 2 are best viewed with the following description.

In operation, light emitted from second light source 140 passes through second primary projection lens 112 (into the page as viewed in FIG. 2). The shaped light then reflects off of beam scanning mirror 130, which is obliquely angled (see FIG. 1) for directing light from the one or more light sources 140 towards secondary projection lens 120, which further shapes the light for projecting forwardly (e.g., in front of a vehicle).

The one or more light sources 140 emit light in a horizontal direction (e.g., side-to-side or cross-car), which is shaped by the one or more primary projection lenses 110, then reflected off of beam scanning mirror 130 and redirected in the longitudinal direction towards secondary projection lens 120. Secondary projection lens 120 is an output optic that further shapes the light and projects it forwardly (e.g., in front of a vehicle). As depicted in FIGS. 1 and 2, first light source 141 and third light source 143 are turned off, while second light source 142 emits rays of light 105 in a horizontal direction.

Light emitted from first, second, and third light sources 141, 142, and 143 produce overlapping beam patterns that contribute to an overall beam pattern of beam scanning headlamp 100. The overall beam pattern is for example a desired light pattern that is projected from a vehicle headlamp. By dimming or turning off individual LEDs, headlamp 100 may be used to provide an adaptive-driving beam headlamp for avoiding glare perceived by occupants of other vehicles and pedestrians. For example, a camera system may be used to image a forward view, and a controller may be used to determine which LEDs to modulate or turn off in real-time or near real-time based on images received from the camera. For example, the controller may dim certain LEDs using pulse-width modulation for shaping and controlling the adaptive-driving beam pattern. In addition to a camera, a GPS module may be used for determining a location of the vehicle and providing location information to the controller. In certain embodiments, radar information may also be provided to the controller for determining which LEDs to turn off or modulate, and for determining how to control beam scanning mirror 130.

The controller is for example a headlamp control module having a computer, a microcontroller, a microprocessor, or a programmable logic controller (PLC) located onboard the vehicle communicatively coupled with first, second, and third light sources 141-143 (e.g., via respective printed circuit boards). The controller includes a memory, including a non-transitory medium for storing software, and a processor for executing instructions of the software. The memory may be used to store information used by the controller, including but not limited to algorithms, lookup tables, and computational models. The controller may include one or more switches (e.g., for performing pulse-width modulation). Communication between the controller and the one or more light sources 140 may be by one of a wired and/or wireless communication media.

In certain embodiments, each of the one or more primary projection lenses 140 includes a collimating optic, which aligns rays of light to be substantially parallel such that they spread minimally as the light propagates. The collimating optic may be oriented such that light emitted from the LEDs is directed horizontally, as depicted in FIG. 1. Therefore, the one or more primary projection lenses 140 control the spread of a beam pattern of light in the horizontal direction. The one or more primary projection lenses 140 may include a lens surface that is an undivided freeform optic surface, undivided aspheric, or undivided modified aspheric surface that generates one collective undivided image in front of a vehicle when the full beam is lit. An aspheric lens is one whose surface differs in shape from portions of a sphere or cylinder. A low-beam function may be incorporated into headlamp 100 by adding LEDs arranged vertically with respect to the LEDs of the one or more light sources 140, and by including an asphere outer lens with a sharp cutoff in secondary projection lens 120 for maintaining light directed downward towards the road and away from the eyes of occupants in nearby vehicles.

In certain embodiments, the one or more primary projection lenses 140 include a modified toric-type projection lens having one or more toric-shaped lenses. A toric-shaped lens may be any lens having at least one lens surface with a curvature that resembles a portion of a torus (e.g., shaped like a slice from a circumferential edge of a torus). A torus is a spatial shape formed by revolving a circle in three-dimensional space about an axis that is coplanar with the circle. The toric-shaped lens surface provides a lens having different optical power and focal length in two orientations perpendicular to each other (e.g., a horizontal orientation and a vertical orientation). In some embodiments, the toric-shaped lenses have a circular shape in one direction, while in the perpendicular direction, the toric-shaped lenses have a spherical, aspherical (e.g., elliptical, hyperbolic, or freeform), or flat surface.

The one or more primary projection lenses 110 include a first surface and a second surface. For example, as enumerated in FIG. 1, first primary light source 111 includes a first surface 111A and a second surface 111B, second primary light source 112 includes a first surface 112A and a second surface 112B, and third primary light source 113 includes a first surface 113A and a second surface 113B. Similarly, as depicted in FIGS. 1 and 2, secondary projection lens 120 includes a first surface 120A and a second surface 120B. Projection lenses are configured so that one of the first and second surfaces is adapted for receiving light and the other one is adapted for projecting light. For example, light may enter a projection lens through the first surface and exit the projection lens through the second surface. In some embodiments, a first surface of one or more projections lenses 110 collects the light emitted from a respective one of the one or more light sources 140 and virtually images it to a point behind the light source. Advantages of this configuration include an increased tolerance to positional variance of the one or more light sources 140, an improved control the image size, and a reduction in an optic thickness needed for the one or more projection lenses 110, which aids in manufacturing.

In operation, the second surface of the one or more primary projection lenses 110 collects a horizontal spread of the light from the respective one or more light sources 140 (see FIG. 1) without affecting a vertical spread of the light. As a result, vertical images are provided throughout an angular extent of the one or more primary projection lenses 110.

Horizontal spread of the light may be controlled using one or more methods. In certain embodiments, each of the one or more primary projection lenses 110 is focused on a center of the one or more light sources 140. For example, primary projection lens 112 is focused on a center of second light source 142. In embodiments where the light source includes a plurality of individual LEDs aligned longitudinally, a lateral shift off of the focal point is provided by virtue of the individual LEDs being aligned to the left and right of the focal point. For example, with a 1×3 array of LEDs arranged linearly includes an LED on either side of the focal point causing a lateral shift off of the focal point that provides spread to the left or right (see e.g., FIGS. 7-9). Alternatively, an entire light source may be positioned off of the focal point to bias the beam pattern to either the left or right. In some embodiments, a second surface (e.g., an exit face) of the one or more primary projection lenses 110 is adapted to provide a spread and/or a shift to the beam pattern.

Light exiting the one or more primary projection lenses 110 provides vertical images that interact with oscillating beam scanning mirror 130. In certain embodiments, mirror 130 is oriented with at a nominal angle of approximately forty-five degrees relative to the direction of the incoming light (e.g., the horizontal direction). In some embodiments, mirror 130 oscillates about the vertical axis at an angle that is about ±2.5° from the nominal angle. A magnitude of the oscillation determines an extent of the horizontal spread. For example, a 2.5° angle of rotation of mirror 130 provides a corresponding five-degree shift in the beam pattern (see FIGS. 3-5). In certain embodiments, the oscillating mirror cycles at about sixty Hertz, but the oscillation rate may be varied without departing from the scope hereof. Oscillation of mirror 130 blends the beam pattern along the horizontal direction (e.g., side-to-side or cross-car). A position sensor may provide position information of mirror 130 to the controller for determining a location of mirror 130 while it oscillates.

After collimated light reflects off of oscillating beam scanning mirror 130, secondary projection lens 120 collects the light along the vertical axis and controls the vertical spread of the beam pattern. Adjustments to vertical spread and/or location of the beam pattern may be performed using secondary projection lens 120. By controlling light output both horizontally and vertically, beam scanning headlamp 100 provides greater control of the light shape.

Secondary lens 120 may be an extruded lens lacking horizontal power. By using an extruded lens, secondary projection lens 120 may accept multiple images created from a plurality of primary projection lenses 110. In certain embodiments, secondary lens 120 includes at least one lens surface having a toric shape to provide different optical power and focal length in two orientations perpendicular to each other. For example, the toric lens surface of secondary lens 120 is arranged for shaping light in the vertical direction perpendicular to the toric lens surface of the one or more primary projection lenses 140. A focal length of secondary projection lens 120 is the total distance of the optical system, including the virtual distance of the one or more primary projection lenses 110. To improve beam image uniformity, second surface 120B may be flat, or it may include pillow optics, flutes, or a swept optic surface. In some embodiments, the first surface 120A is either flat or a non-flat optical surface.

FIGS. 3-12 show representative beam patterns provided using beam scanning headlamp 100 of FIGS. 1-2. The beam patterns are plotted as contour maps with the horizontal spread of light along the plot's horizontal axis and the vertical spread along the plot's vertical axis. Darker regions of the contour plots indicate a higher flux of light in lumens, whereas lighter regions of the contour plots indicate a lower flux of light.

Figure 3:
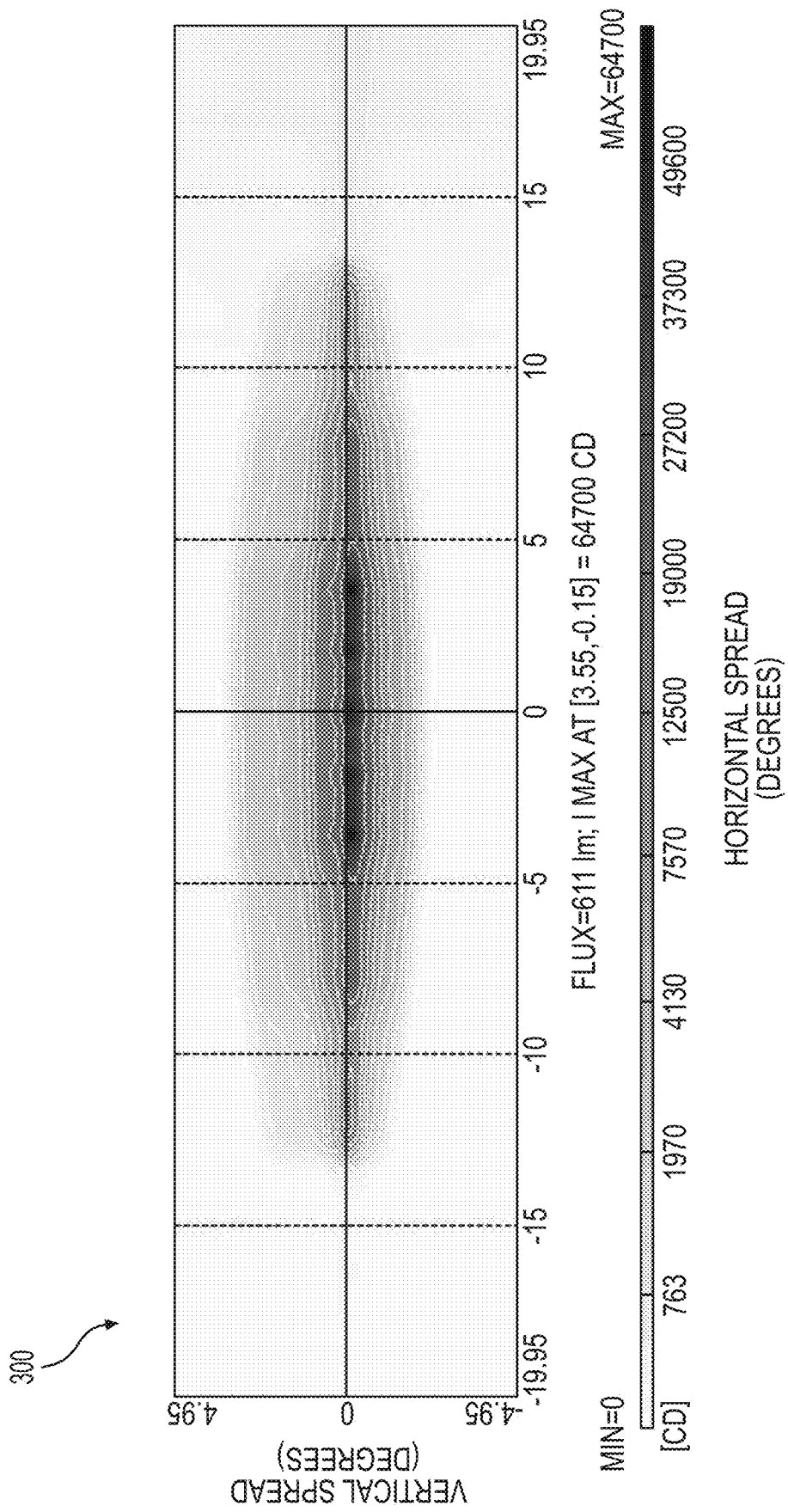
FIG. 3 shows a contour map of an exemplary beam pattern generated using the adaptive beam scanning headlamp of FIG. 1.
Figure 4:
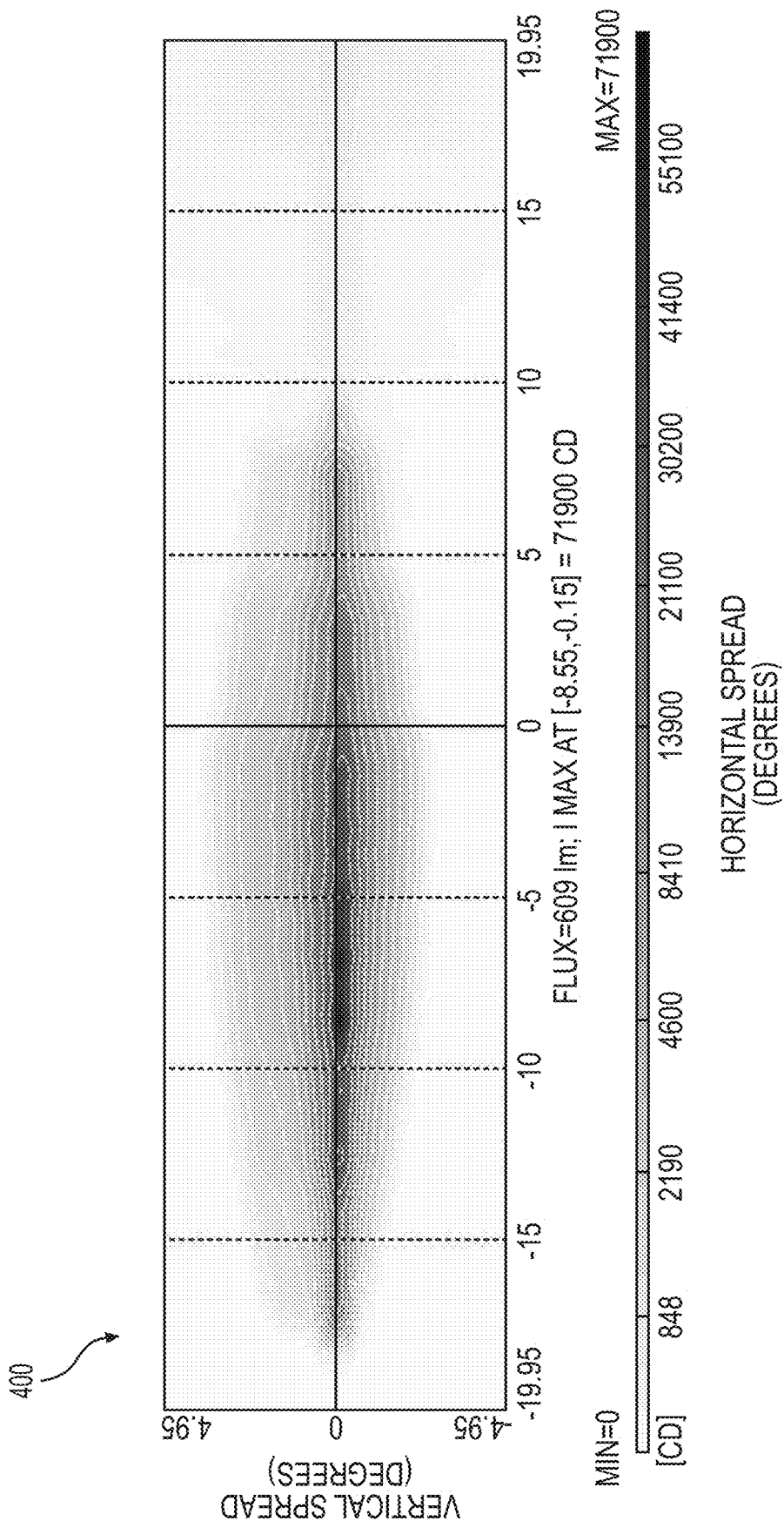
FIG. 4 shows a contour map of another exemplary beam pattern generated using the adaptive beam scanning headlamp of FIG. 1.
Figure 5:
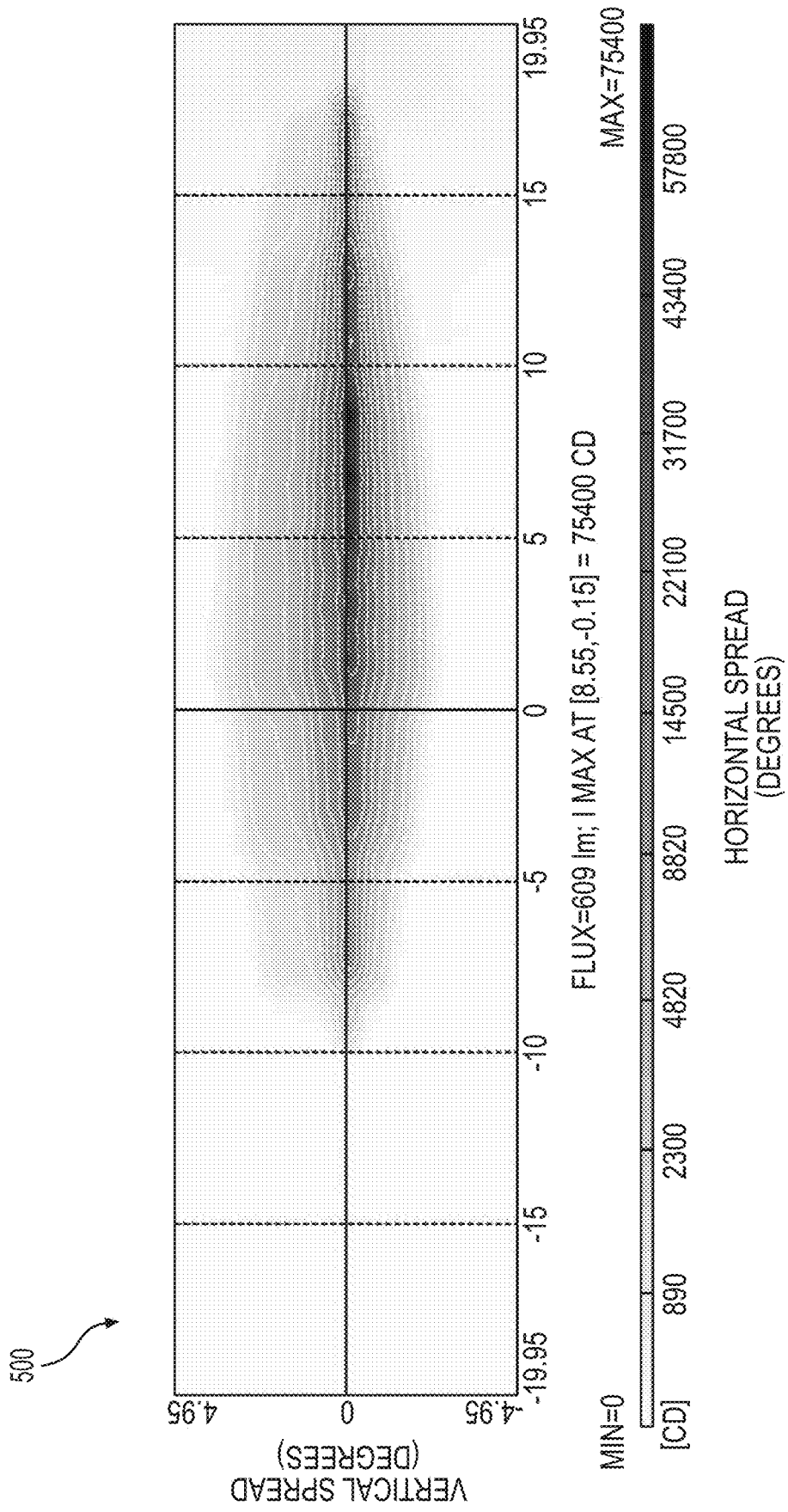
FIG. 5 shows a contour map of yet another exemplary beam pattern generated using the adaptive beam scanning headlamp of FIG. 1.

FIGS. 3-6 show contour maps 300, 400, 500, and 600 of representative beam patterns formed using beam scanning headlamp 100 while having first, second, and third light sources 141, 142, 143 fully illuminated. In other words, nine LEDs (e.g., three 1×3 arrays of LEDs) were illuminated to produce the broad beam patterns depicted in FIGS. 3-6. By altering an angular bias of oscillating beam scanning mirror 130, the resulting beam pattern may be shifted along the horizontal axis as depicted in FIGS. 3-5.

FIG. 3 shows contour map 300 of a beam pattern resulting from light sources 141-143 illuminated and mirror 130 oscillating about a nominal position. In other words, to produce the contour plot depicted in FIG. 3, mirror 130 is nominally oriented at a forty-five degree angle with respect to the horizontal direction as depicted in FIG. 1, while mirror 130 oscillates to provide a horizontal spread of the beam pattern of approximately ±12.5° from nominal.

FIG. 4 shows contour map 400 of a beam pattern resulting from light sources 141-143 illuminated and mirror 130 oscillating about a +2.5° biased position. This shifts the entire beam pattern by an angle of approximately five degrees to the left compared to that of the nominal position shown in contour map 300, FIG. 3.

FIG. 5 shows contour map 500 of a beam pattern resulting from light sources 141-143 illuminated and mirror 130 oscillating about a −2.5° biased position. This shifts the entire beam pattern by an angle of approximately five degrees to the right compared to that of the nominal position shown in contour map 300, FIG. 3.

Figure 6:
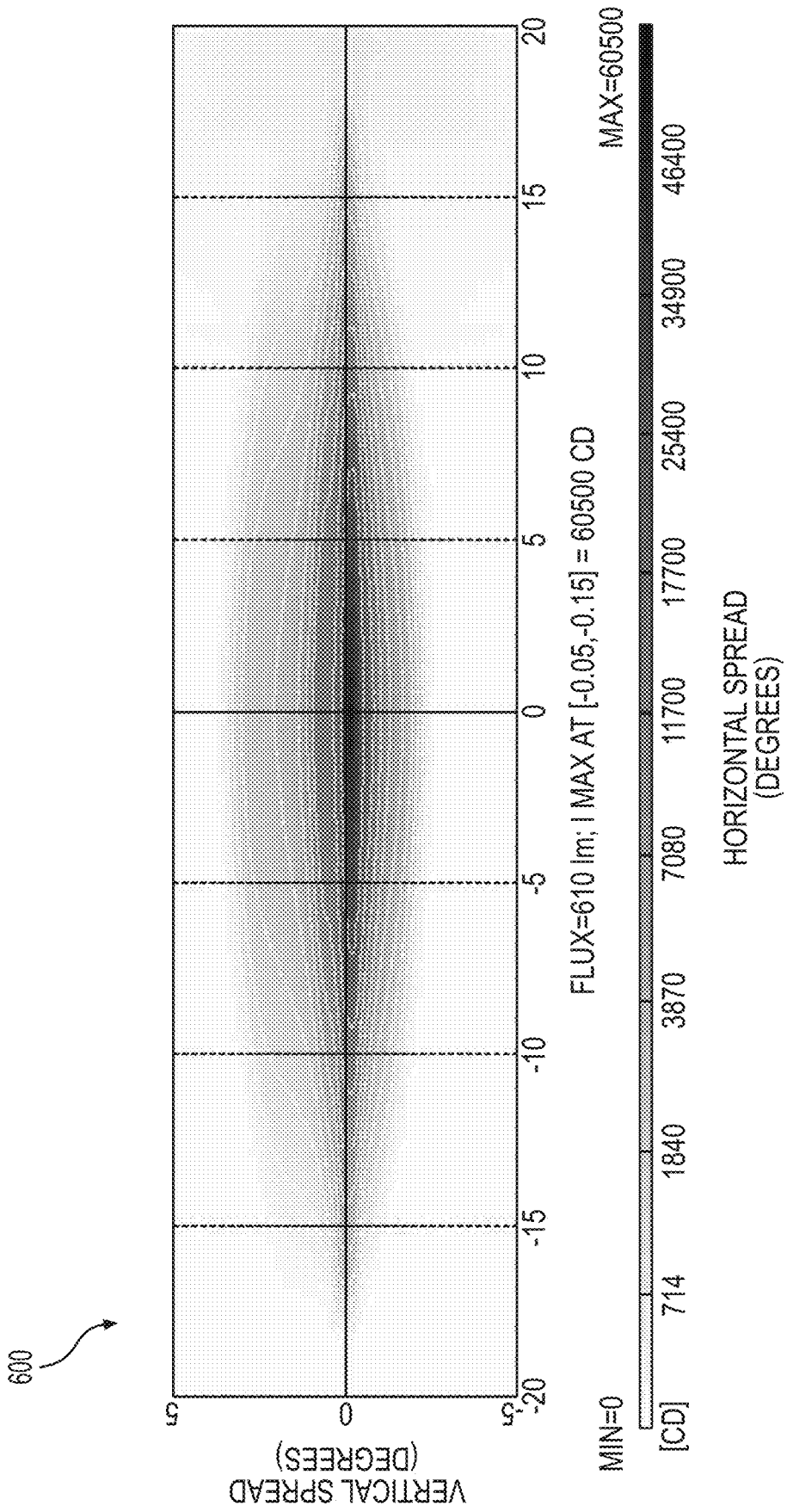
FIG. 6 shows a contour map of an exemplary cumulative beam pattern generated using the adaptive beam scanning headlamp of FIG. 1.

FIG. 6 shows contour map 600 of a cumulative beam pattern resulting from light sources 141-143 illuminated and mirror 130 rotating between a +2.5° biased position and a −2.5° biased position. By rotating the nominal position of mirror 130 while oscillating, the horizontal spread of the beam pattern is broadened to approximately ±17.5° from nominal compared to only ±12.5° from nominal as shown in contour map 300, FIG. 3.

Figure 7:
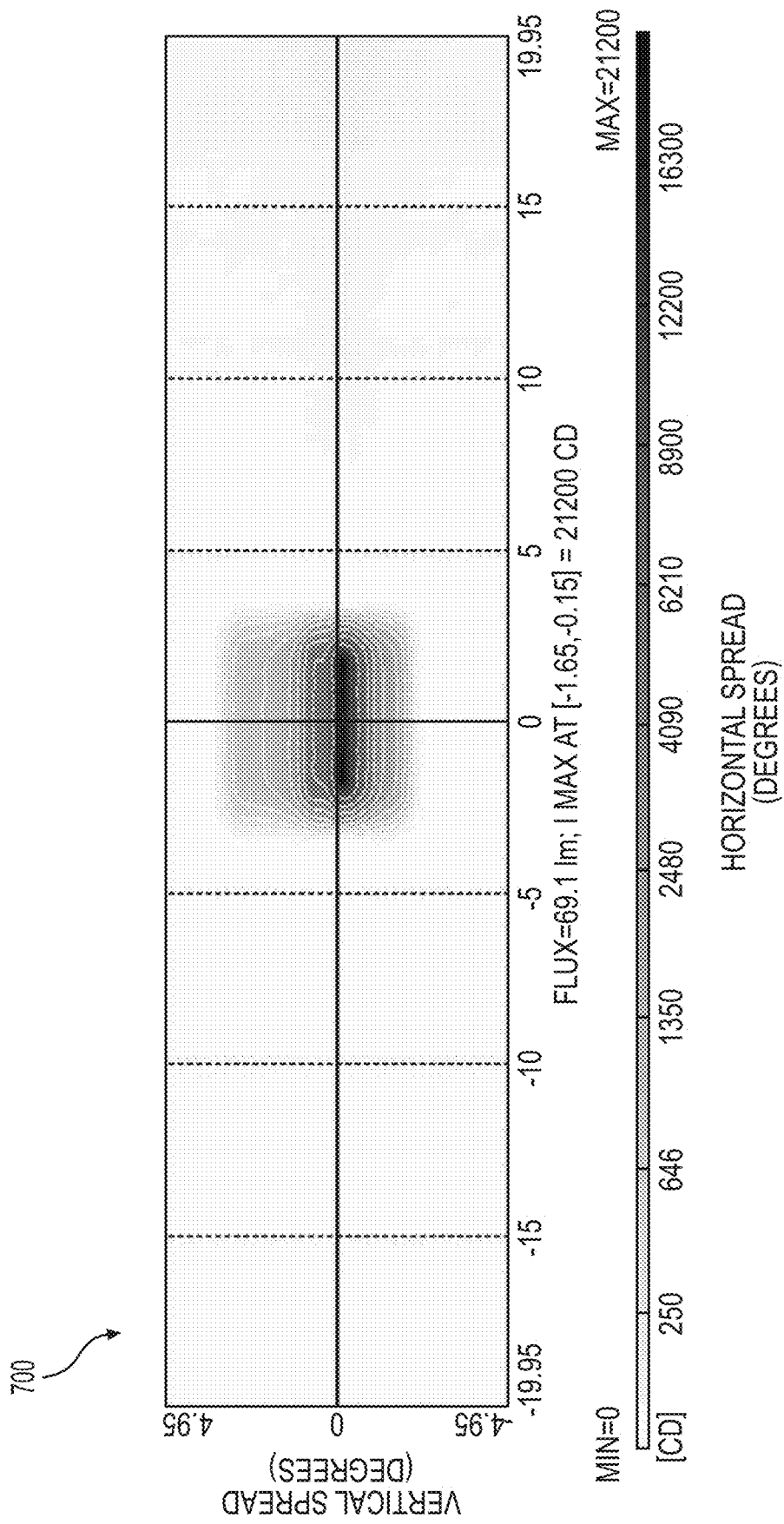
FIG. 7 shows a contour map of an exemplary beam pattern generated from one LED of the adaptive beam scanning headlamp of FIG. 1.
Figure 8:
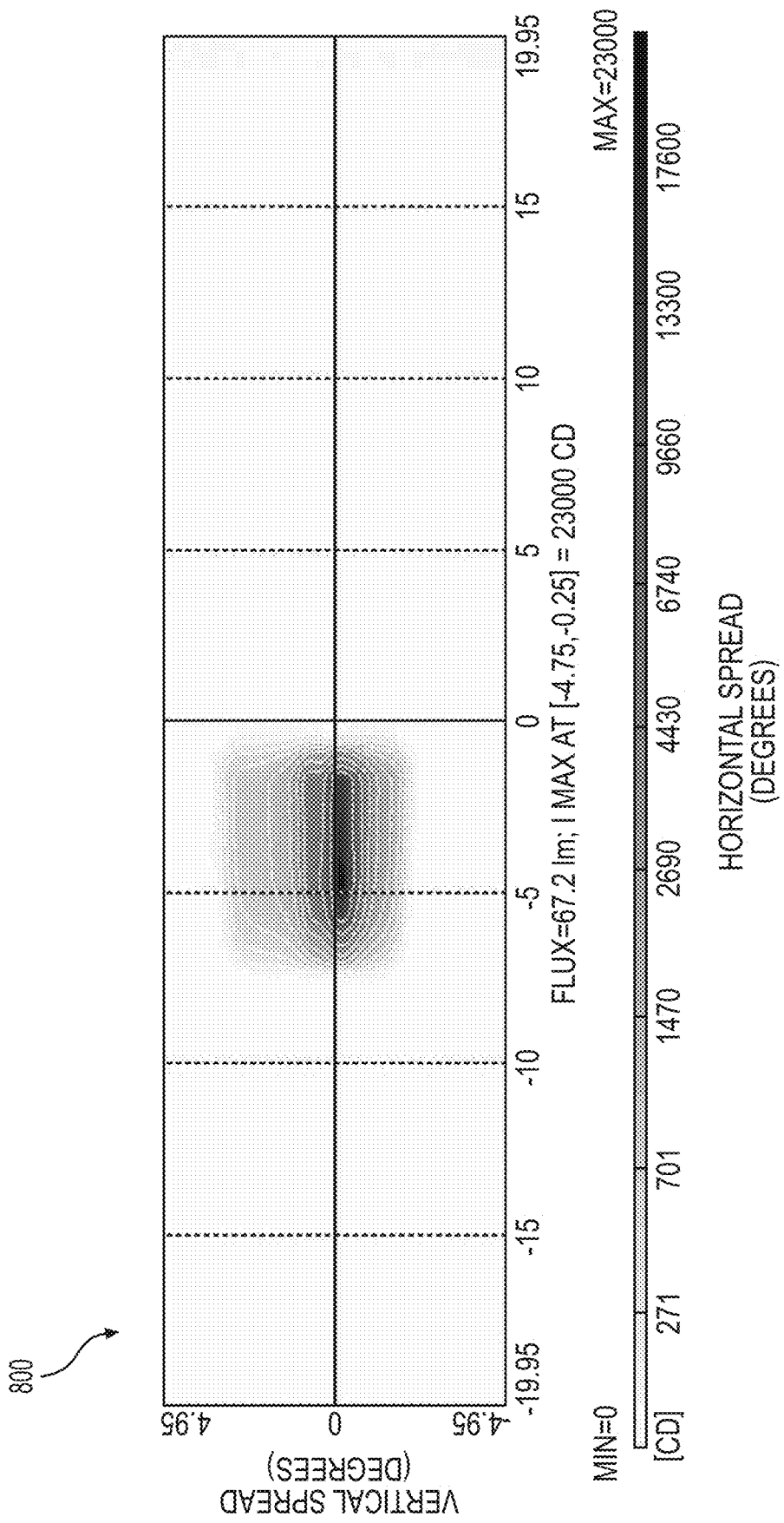
FIG. 8 shows a contour map of another exemplary beam pattern generated from another LED of the adaptive beam scanning headlamp of FIG. 1.
Figure 9:
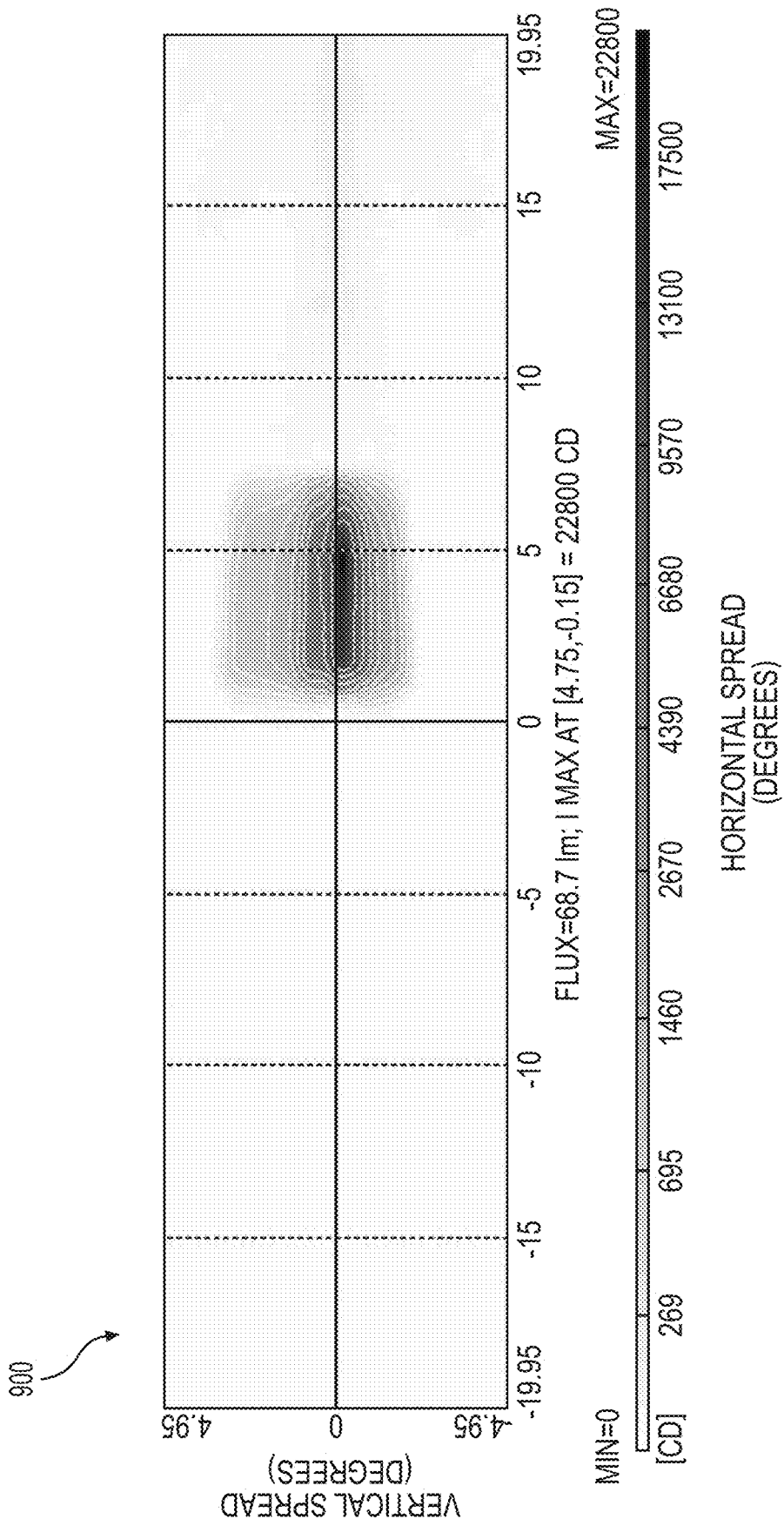
FIG. 9 shows a contour map of yet another exemplary beam pattern generated from yet another LED of the adaptive beam scanning headlamp of FIG. 1.

FIGS. 7-9 show contour maps 700, 800, 900, respectively, of representative beam patterns formed using beam scanning headlamp 100 while having only one LED of the one or more light sources 140 illuminated. Having only one LED illuminated, as shown in FIGS. 7-9, provides a narrow horizontal spread of the beam pattern compared to having nine LEDs from light sources 141-143 illuminated as shown in FIGS. 3-5. For FIGS. 7-9, mirror 130 was oscillated about the nominal mirror position (e.g., about zero degrees along the horizontal direction).

FIG. 7 shows contour map 700 of a beam pattern resulting from illuminating only a center LED from the 1×3 array of LEDs of light source 142. This provides a narrow beam pattern that is centrally located along the horizontal direction.

FIG. 8 shows contour map 800 of a beam pattern resulting from illuminating only a rearward LED from the 1×3 array of LEDs of light source 142. The rearward LED position is furthest from secondary projection lens 120 along the longitudinal direction (see FIG. 1). Illuminating only the rearward LED of light source 142 provides a narrow beam pattern that is shifted to the left along the horizontal direction compared to the beam pattern shown in contour map 700, FIG. 7.

FIG. 9 shows contour map 900 of a beam pattern resulting from illuminating only a forward LED from the 1×3 array of LEDs of light source 142. The forward LED position is opposite of the rearward position and is closest to secondary projection lens 142 along the longitudinal direction (e.g., forward with respect to a vehicle). This provides a narrow beam pattern that is shifted to the right along the horizontal direction compared to the beam pattern shown in contour map 700, FIG. 7.

Figure 10:
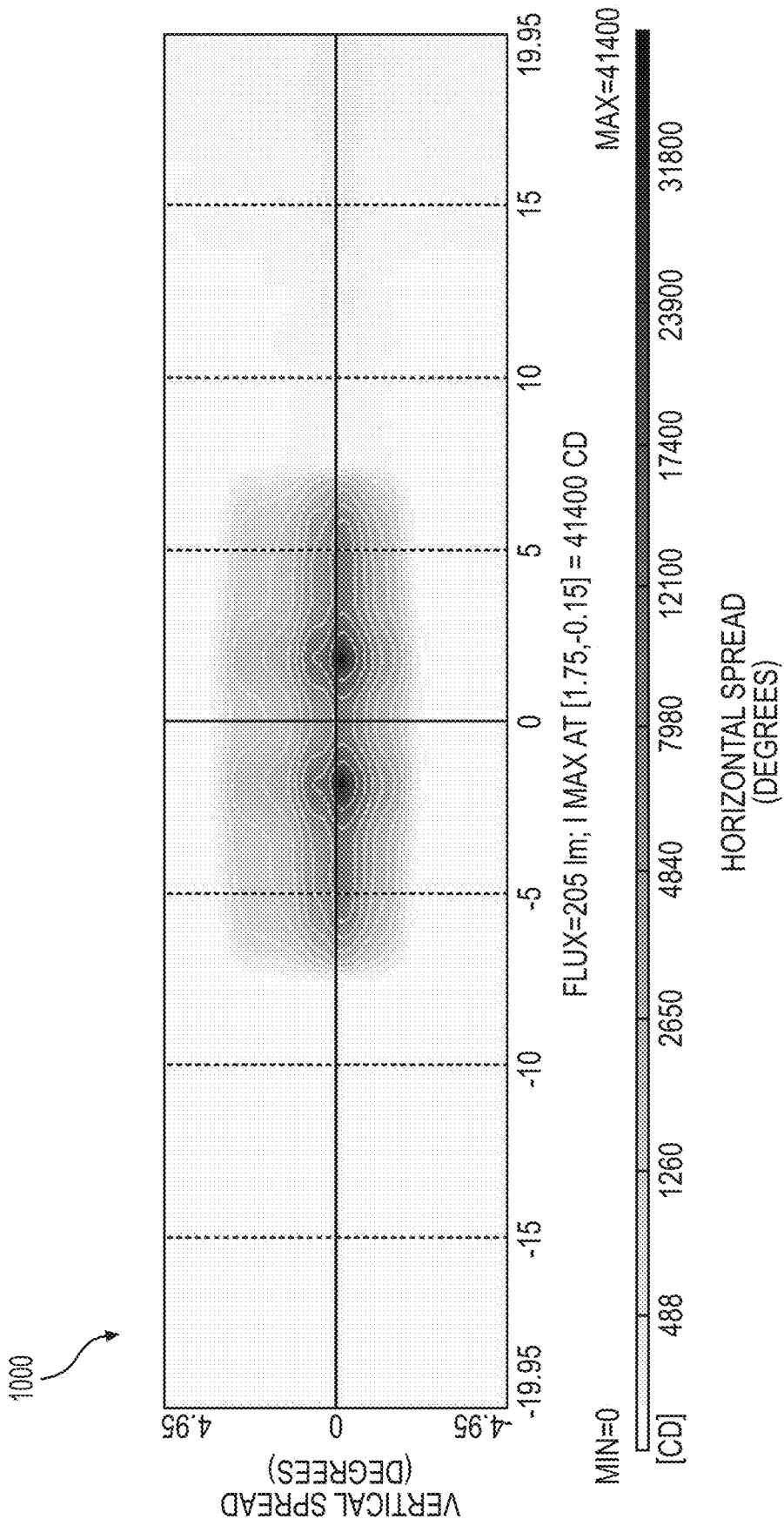
FIG. 10 shows a contour map of an exemplary beam pattern generated from a light source of the adaptive beam scanning headlamp of FIG. 1.
Figure 11:
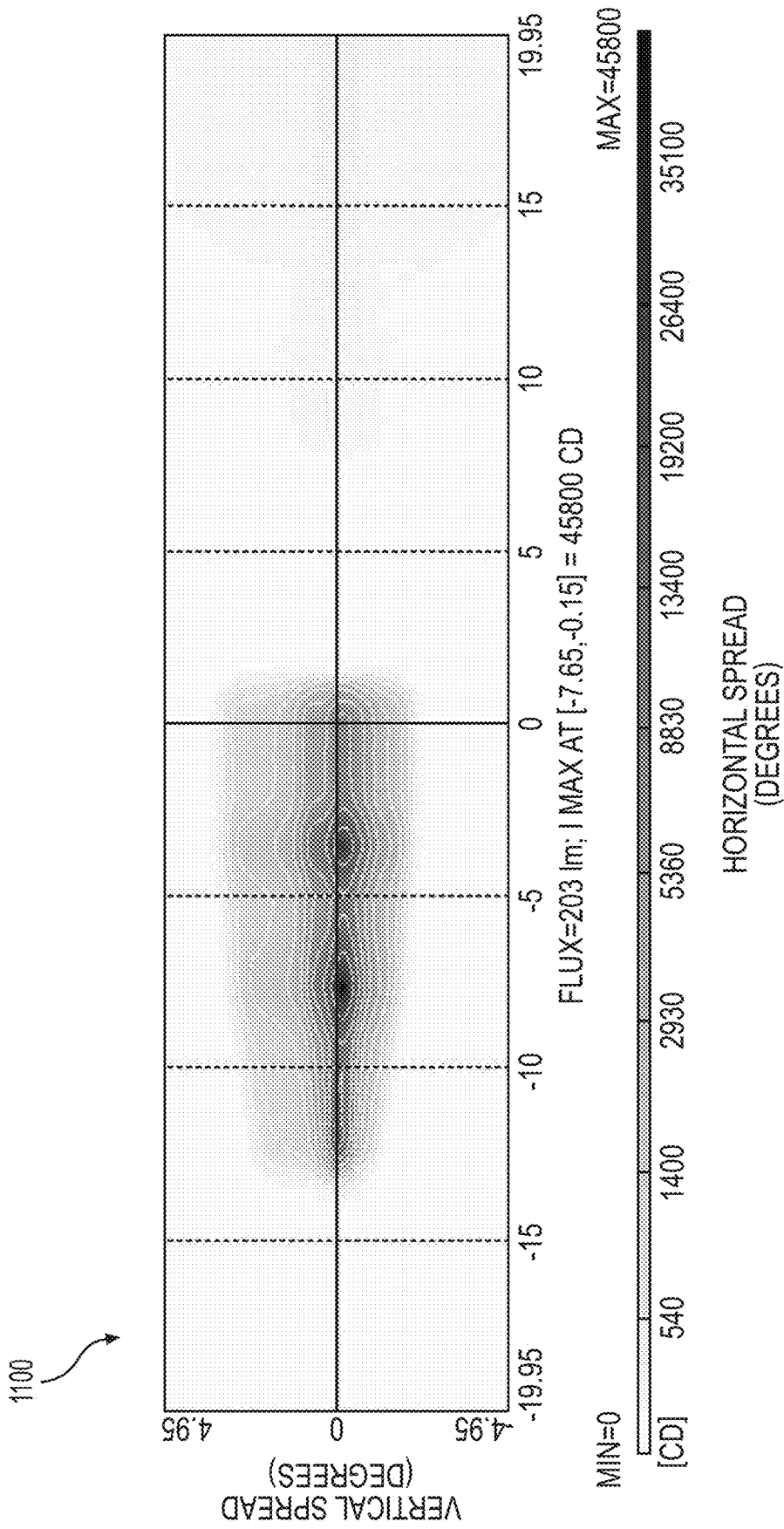
FIG. 11 shows a contour map of another exemplary beam pattern generated from another light source of the adaptive beam scanning headlamp of FIG. 1.
Figure 12:
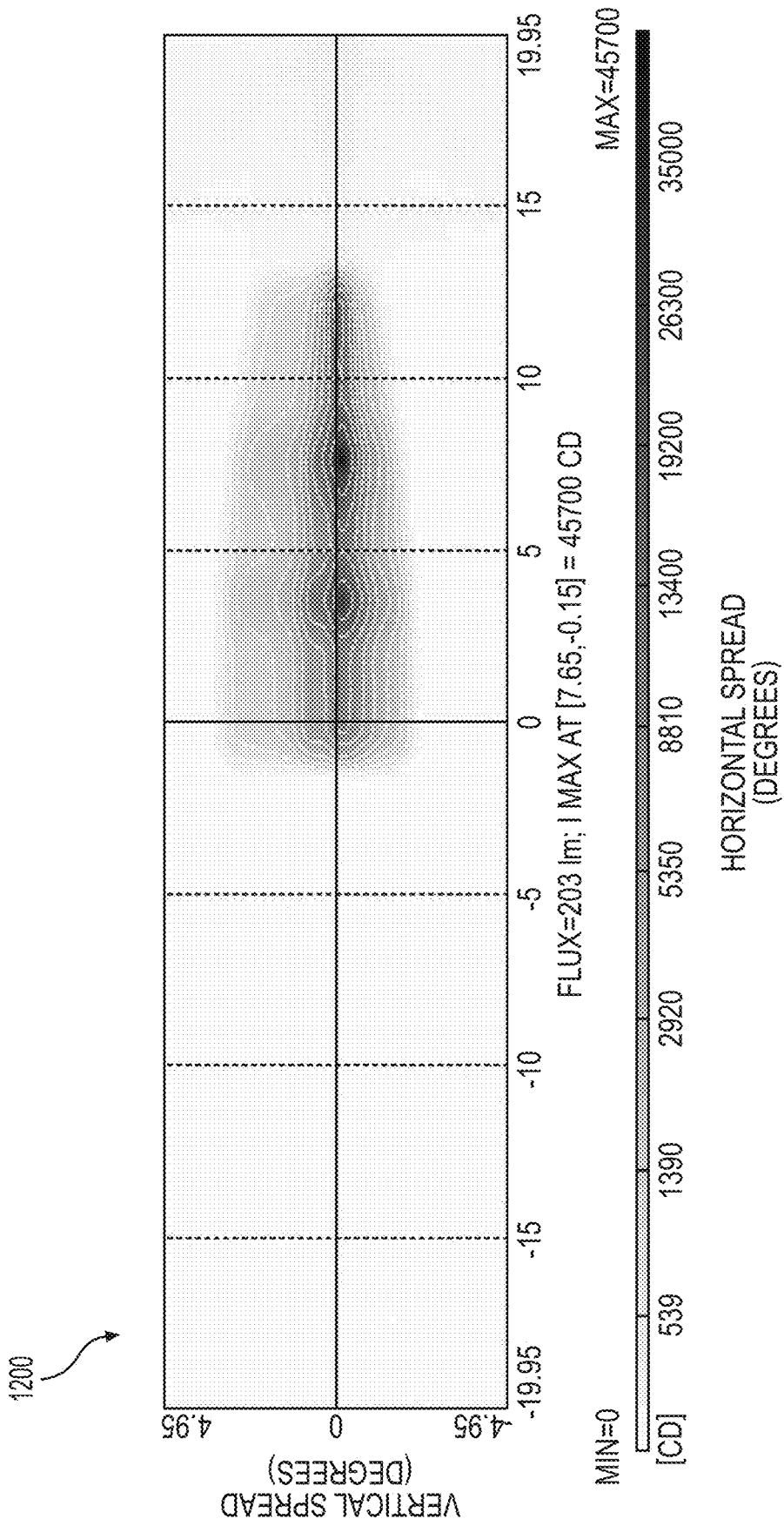
FIG. 12 shows a contour map of yet another exemplary beam pattern generated from yet another light source of the adaptive beam scanning headlamp of FIG. 1.

FIGS. 10-12 show contour maps 1000, 1100, 1200 of representative beam patterns formed using beam scanning headlamp 100 while having all three LEDs illuminated from one of first, second, and third light sources 141, 142, 143. Having one of the 1×3 arrays of LEDs from light sources 141-143 illuminated provides a mid-sized horizontal spread of the beam pattern. In other words, the mid-sized beam pattern is narrower than the broad beam pattern of FIGS. 3-5 and broader than the narrow beam pattern of FIGS. 7-9. For FIGS. 10-12, mirror 130 oscillates about the nominal mirror position (e.g., about zero degrees along the horizontal direction).

FIG. 10 shows contour map 1000 of a beam pattern resulting from illuminating the 1×3 array of LEDs from light source 142 only. This provides a mid-sized beam pattern that is centrally located along the horizontal direction.

FIG. 11 shows contour map 1100 of a beam pattern resulting from illuminating the 1×3 array of LEDs from light source 143 only. This provides a mid-sized beam pattern that is shifted to the left along the horizontal direction compared to that of contour map 1000, FIG. 10.

FIG. 12 shows contour map 1200 of a beam pattern resulting from illuminating the 1×3 array of LEDs from light source 141 only. This provides a mid-sized beam pattern that is shifted to the right along the horizontal direction.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A headlamp for a vehicle, comprising:
    a light source;
    a primary projection lens for shaping light from the light source, the primary projection lens comprising a modified toric-type projection lens having a toric-shaped exit surface adapted to shape light along a first direction;
    an oscillating mirror obliquely angled at a nominal angle of approximately forty-five degrees relative to the direction of light received from the first projection lens between the primary projection lens and a secondary projection lens to receive light from the primary projection lens and redirect the light to the secondary projection lens;
    a secondary projection lens being adapted to receive light from the oscillating mirror, the secondary projection lens being adapted to shape light received from the oscillating mirror along a second direction substantially perpendicular to the first direction such that a desired light pattern is projected from the vehicle; and
    a controller for controlling the light source and the oscillating mirror to actively dim or turn off portions of the desired light pattern to provide an adaptive-driving beam headlamp for reducing glare perceived outside the vehicle.

2. The headlamp for a vehicle of claim 1, wherein a first surface of the primary projection lens collects light emitted from the light source, collimates the light, and projects the light horizontally.

3. The headlamp for a vehicle of claim 1, wherein the oscillating mirror oscillates by a predetermined magnitude from the nominal angle, under control of the controller, for determining a horizontal spread of the desired light pattern.

4. The headlamp for a vehicle of claim 1, wherein the secondary projection lens is an extruded lens lacking horizontal power and adapted to shape a vertical spread of the desired light pattern, and at least one lens surface of the secondary projection lens comprises a toric shape adapted to provide a different optical power and focal length from the primary projection lens.

5. The headlamp for a vehicle of claim 1, wherein the light source comprises a linear array of light-emitting diodes (LEDs).

6. The headlamp for a vehicle of claim 5, wherein the linear array of LEDs produce overlapping beam patterns that contribute to the desired light pattern.

7. The headlamp for a vehicle of claim 5, wherein the controller dims certain LEDs from the linear array of LEDs using pulse-width modulation for shaping and controlling the desired light pattern.

8. The headlamp for a vehicle of claim 7, further comprising a camera system for imaging a forward view such that the controller determines how to modulate or turn off certain LEDs and how to oscillate the oscillating mirror in real-time or near real-time based on images received from the camera.

9. The headlamp for a vehicle of claim 5, wherein the primary projection lens comprises a plurality of modified toric-type projection lenses for receiving light from one or more LEDs of the linear array of LEDs.

10. The headlamp for a vehicle of claim 1, wherein the oscillating mirror oscillates at a frequency of about sixty Hertz.

11. The headlamp for a vehicle of claim 1, wherein a first surface of the primary projection lens is adapted to virtually image light from the light source to a point located behind the light source such that an optic thickness of the primary projection lens is reduced.

12. An adaptive beam scanning headlamp for a vehicle, comprising:
   a plurality of light sources arranged linearly, with each of the plurality of light sources having a linear array of LEDs;
   a plurality of primary projection lenses for shaping light from the plurality of light sources, respectively;
   an oscillating mirror obliquely angled to reflect light from the plurality of primary projection lenses;
   a secondary projection lens configured to receive light reflected from the oscillating mirror, the secondary projection lens being adapted to further shape the light for projecting a beam pattern from the vehicle; and
   a controller adapted for controlling each of the plurality of light sources and the oscillating mirror to actively dim or turn off portions of the beam pattern for reducing glare perceived outside the vehicle,
   wherein each of the a plurality of primary projection lenses is a modified toric-type projection lens having a toric-shaped exit surface adapted to shape light along a first direction, and at least one lens surface of the secondary projection lens comprises a toric shape adapted to shape light along a second direction perpendicular to the first direction.

13. The adaptive beam scanning headlamp of claim 12, wherein the plurality of primary projection lenses are adapted to shape light along a first horizontal direction with respect to the vehicle, and the secondary projection lens comprises a different optical power and focal length than each of the plurality of primary projection lenses, wherein the secondary projection lens is adapted to shape light along a vertical direction with respect to the vehicle.

14. The adaptive beam scanning headlamp of claim 13, wherein each of the linear array of LEDs from the plurality of light sources collectively illuminate a broad beam pattern in the horizontal direction.

15. The adaptive beam scanning headlamp of claim 12, wherein the plurality of primary projection lenses comprises a central projection lens and two peripheral projection lenses arranged on opposite sides of the central projection lens, the central projection lens being aligned with a central region of the oscillating mirror such that the beam pattern from the central projection lens provides a mid-sized beam pattern aligned centrally in the horizontal direction.

16. The adaptive beam scanning headlamp of claim 15, wherein each of the two peripheral projection lenses is aligned outside of central region of the oscillating mirror such that the beam pattern from each of the two peripheral projection lenses provides a mid-sized beam pattern aligned peripherally in the horizontal direction.

17. The adaptive beam scanning headlamp of claim 12, wherein a single LED from the linear array of LEDs provides a narrow spot beam pattern in the horizontal direction.

18. The adaptive beam scanning headlamp of claim 15, wherein a single LED from the linear array of LEDs aligned with the central projection lens provides a narrow spot beam pattern aligned centrally in the horizontal direction.

19. The adaptive beam scanning headlamp of claim 16, wherein a single LED from the linear array of LEDs aligned with one of the two peripheral projection lenses provides a narrow spot beam pattern aligned peripherally in the horizontal direction.

20. An adaptive beam scanning headlamp for a vehicle, comprising:
   a linear array of LEDs;
   a plurality of primary projection lenses each having a toric-shaped exit surface, wherein the plurality of primary projection lenses are adapted for shaping light from the linear array of LEDs along a horizontal direction with respect to the vehicle;
   an oscillating mirror positioned at a nominal angle relative to the direction of light received from the plurality of primary projection lenses, the nominal angle being configured for reflecting the light in a predetermined direction;
   a secondary projection lens having at least one lens surface with a toric shape, the secondary projection lens being positioned to receive the light reflected from the oscillating mirror and adapted to shape the light along a vertical direction with respect to the vehicle; and
   a controller adapted to independently control each LED of the linear array of LEDs to actively dim or turn off portions of the beam pattern, and the controller being further adapted to adjust the nominal angle and to control the oscillation angle of the oscillating mirror for shaping light emitted from the adaptive beam scanning headlamp.

* * * * *